United States Patent [19]
Reggio et al.

[11] 4,379,169
[45] Apr. 5, 1983

[54] NEW GUM BASE AND CHEWING GUM CONTAINING SAME

[75] Inventors: Richard A. Reggio, Yorktown Heights; Ronald P. D'Amelia, Hicksville, both of N.Y.; Dominick R. Friello, Danbury, Conn.

[73] Assignee: Nabisco Brands, Inc., New York, N.Y.

[21] Appl. No.: 319,490

[22] Filed: Nov. 9, 1981

[51] Int. Cl.³ .............................................. H23G 3/30
[52] U.S. Cl. ............................................. 426/3; 426/6
[58] Field of Search ................................. 426/3, 4, 5, 6

[56] References Cited

U.S. PATENT DOCUMENTS

| | | |
|---|---|---|
| 3,063,844 | 11/1962 | Meguro et al. . |
| 3,262,784 | 7/1966 | Bucher .................................... 426/5 |
| 3,285,750 | 11/1966 | Ishida et al. . |
| 3,974,293 | 8/1976 | Witzel ..................................... 426/4 |
| 3,984,574 | 10/1976 | Comollo . |
| 3,995,064 | 11/1976 | Ehrgott .................................... 426/3 |
| 4,064,274 | 12/1977 | Mackay et al. ......................... 426/3 |
| 4,186,214 | 1/1980 | Crouse et al. ........................... 426/3 |
| 4,187,320 | 2/1980 | Koch et al. . |
| 4,202,906 | 5/1980 | Ogawa et al. . |
| 4,241,091 | 12/1980 | Stroz et al. .............................. 426/4 |
| 4,248,894 | 2/1981 | Mackay et al. ......................... 426/3 |

Primary Examiner—Jeanette M. Hunter
Attorney, Agent, or Firm—Richard Kornutik

[57] ABSTRACT

A gum base is provided which has excellent film-forming properties and thus is particularly suited for use in a bubble gum. The gum base contains 50 to 80% ester gums and a unique fatty acid or fatty acid ester plasticizer, such as glycerol monooleate, and is free of conventional fillers. A bubble gum containing such gum base is also provided.

13 Claims, No Drawings

NEW GUM BASE AND CHEWING GUM CONTAINING SAME

FIELD OF THE INVENTION

The present invention which is related to commonly-owned pending application Ser. No. 332,625, filed Dec. 21, 1981, is a novel chewing gum base containing high levels of ester gums, no fillers and a unique plasticizing agent which imparts superior film-forming properties to the gum base, making it especially suited as a bubble gum base. The present invention also relates to chewing gum containing such gum base and to a method for preparing same.

BACKGROUND OF THE INVENTION

Chewing gums available today generally contain a natural rubber gum base, a synthetic rubber gum base or a mixture of natural and synthetic rubber gum bases. In the case of synthetic rubber gum bases, the elastomer usually employed is styrene-butadiene copolymer which is plasticized with glycerol esters of rosin. If a conventional bubble gum base is desired, 25–40% ester gum is usually used as the film-former. Also, appreciable levels of filler, e.g., calcium carbonate, talc, are used to assist in film-forming. Lecithin has also been used in the gum or gum base to soften the extremely firm chew imparted by the use of the ester gums in the gum base. The ester gums, lecithin or other softeners, such as, glycerol monostearate used at required levels to soften the gum base tend to destroy the natural film-forming properties making it undesirable for use as a bubble gum base.

DESCRIPTION OF THE INVENTION

In accordance with the present invention, a gum base is provided which contains substantial amounts of ester gums yet has highly superior film-forming properties and thus has superior bubble-blowing character, is substantially less tacky than prior art ester gum containing chewing gums and remains soft for prolonged periods. In addition, the gum base of the invention contains no filler and thus may contain mint as well as acid or fruit flavors. The above advantages are achieved in the gum base of the invention by employing from about 50 to about 85% by weight ester gums together with a unique plasticizing agent which includes fatty acids, glycerol ester of fatty acids, polyglycerol esters of fatty acids, or sorbitan or polysorbate esters of fatty acids, and no fillers. Thus, the gum base of the invention will generally comprise one or more natural and/or synthetic elastomers in an amount within the range of from about 0.5 to about 25%, and preferably from about 4 to about 15% by weight of the gum base, ester gum resin in an amount within the range of from about 50 to about 85%, and preferably from about 60 to about 80% by weight of the gum base, plasticizing agent in an amount within the range of from about 1 to about 25%, and preferably from about 5 to about 20% by weight of the gum base, together with softeners in an amount within the range of from about 0 to about 10%, and preferably from about 2 to about 8% by weight of the gum base, and waxes in an amount within the range of from about 1 to about 20%, and preferably from about 3 to about 16% by weight of the gum base.

The unique plasticizing agent whith may be employed in the gum base of the invention includes fatty acids, such as oleic acid, lauric acid, lactic acid, isostearic acid, caprylic acid, capric acid or stripped coco; glycerol esters of fatty acids such as mono-, di- or triglycerol esters of any of the fatty acids listed above, with glycerol monooleate being preferred; polyglycerol esters of fatty acids such as any of those listed above, having a hydrophilic/hydrophobic character of HLB 2 to 13; or sorbitan or polysorbate esters of fatty acids such as any of those listed above.

Another of the unique features of the gum base of the invention is the use of the extraordinarily large amounts of ester gums (normally a tackifier) yet the amount of tack in the gum base is less than conventional ester gum type base which contains 25 to 40% ester gum. It is believed that the reduced tackiness in the gum base of the invention is attributed to the maintenance of an ester gum to elastomer weight ratio of from about 5:1 to about 8:1 whereas, in convention ester gum containing gum base, such ratio is maintained at or below 4:1. The ester gums which may be employed in the gum base of the invention include any of those normally employed in conventional gum base such as hydrogenated ester gum, that is glycerol ester of hydrogenated rosin and/or dimerized ester gum, pentaerythritol ester gum, polymerized ester gum, or ester gum.

In preferred embodiments, the gum base of the invention will contain one or more waxes which serve as texture modifiers and should have a melting point of above about 35° C. The waxes will be present in an amount within the range of from about 1 to about 20%, and preferably from about 3 to about 16% based on the weight of the gum base. Examples of such waxes include paraffin wax, microcrystalline wax, carnauba wax, ozokerite wax, oricury wax and the like. Preferred waxes are microcrystalline wax, and paraffin wax employed in combination so that from about 0 to about 15% (based on the weight of the gum base) of the microcrystalline wax is employed with from about 0 to about 15% (based on the weight of the gum base) of the paraffin wax. The waxes are found to reduce the tackiness of the final gum composition without significantly reducing cohesivity thereof.

The gum base of the invention may, but will preferably, contain additional softeners, emulsifiers, and/or lubricants, such as one or more hydrogenated vegetable or animal fats having a melting point above 22° C., in an amount within the range of from about 0 to about 10% and preferably from about 0.5 to about 7% by weight of the gum base. Examples of such softeners include, but are not limited to, glycerol monostearate, lecithin, coconut oil, fatty acids such as stearic acid, or palmitic acid, partially hydrolyzed polyvinyl esters, or mono-, di- and triglycerol esters of fatty acids as described above.

The elastomers which may be present in the gum base of the invention include styrene-butadiene copolymer, isobutylene-isoprene copolymer, polyisobutylene, natural rubber (polyisoprene) as well as other masticatory substances of natural origin, such as rubber latex solids, chicle, crown gum, nispero, rosidinha, jelutong, pendare, perillo, niger gutta, tunu, etc. The elastomer or masticatory substance will be employed in an amount within the range of from about 0.5 to about 25%, preferably from about 4 to about 15% by weight of the gum base.

The following represents preferred gum base formulations in accordance with the present invention.

| Ingredient | % by Weight |
| --- | --- |
| Elastomer | 4 to 15 |
| (preferred is styrene-butadiene copolymer (24% bound styrene) and/or (48% bound styrene)) | |
| Ester gum | 60 to 80 |
| Plasticizer | 5 to 20 |
| (preferably glycerol monooleate) | |
| Waxes | 5 to 15 |
| (preferably microcrystalline wax and/or paraffin wax) | |
| Softeners | 0 to 10 |
| (preferably glycerol monostearate) | |

It has been found that, in accordance with the teachings of the present invention, the use of glycerol esters of fatty acids, preferably oleic acid, enhances rather than reduces the film-forming properties of a bubble gum.

It has also been found that where glycerol monooleate is employed as the unique plasticizing agent, an excellent bubble gum base and bubble gum are produced. Glycerol monooleate has been found to be a superior film-forming plasticizing agent for ester gum, far and away better than glycerol monostearate or other conventional gum additives. The film-forming capability of glycerol monooleate increases as its weight percent in the gum base formula increases. Thus, improved bubble blowing capacity is obtained with the use of increasing amounts of glycerol monooleate. In addition, bubble blowing capability is maintained even though the gum base of the invention does not contain conventional fillers, such as calcium carbonate or talc.

The gum base of the invention as described above may be formed by simply mixing the various ingredients thereof until a homogeneous mixture is obtained.

The gum base of the invention may be employed in forming a chewing gum, especially a bubble gum, and in such case the gum base will be present in an amount of within the range of from about 10 to about 40% and preferably from about 15 to about 30% by weight of the chewing gum.

The chewing gum of the invention may be of the sugar-containing or sugarless variety. Examples of sweeteners which may be employed include sugars, for example, monosaccharides of 5 or 6 carbon atoms, such as arabinose, xylose, ribose, glucose, mannose, galactose, fructose, dextrose, or sorbose or mixtures of two or more of the foregoing monosaccharides; disaccharides, for example, sucrose, such as cane or beet sugar, lactose, maltose or cellobiose; polysaccharides, such as partially hydrolyzed starch or dextrin, as well as sugar alcohols, such as sorbitol, mannitol, xylitol, or mixtures thereof, as well as hydrogenated starch hydrolysates or isomaltitol, and mixtures of two or more of the above sugars and/or sugar alcohols.

Any of the above sugars may be present in an amount of within the range of from about 0.05 to about 90% and preferably from about 40 to about 85% by weight of the chewing gum. The sugar alcohols, where present, will be employed in an amount of from about 0.05 to about 90% and preferably from about 40 to about 85% by weight of the chewing gum.

The chewing gum of the invention may also contain in lieu of or in addition to any of the above sugars or sugar alcohols an artificial sweetener, such as, for example, aspartame, cyclamate, or a saccharin or other sweetener as set out hereinafter, the artificial sweetener being present in an amount of from 0 to about 1.5% by weight, and preferably, from about 0.05 to about 0.3% by weight of the chewing gum.

Examples of artificial sweeteners which may be employed herein include sodium, calcium or ammonium saccharin salts, dihydrochalcones, glycyrrhizin, dipotassium glycyrrhizin, glycyrrhizic acid ammonium salt, L-aspartyl-L-phenylalanine methyl ester (aspartame), the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Ace-sulfame-K), as well as *Stevia rebaudiana* (Stevioside), *Richardella dulcifica* (Miracle Berry), *Dioscoreophyllum cumminsii* (Serendipity Berry), cyclamate salts, and the like, or mixtures of any two or more of the above.

The chewing gum of the invention may include flavoring, such as sour or fruit flavoring or non-acid or mint flavoring in an amount ranging from about 0.5 to about 2% by weight of the final chewing gum product. The flavoring may comprise synthetic flavors and oils derived from plants, leaves, flowers, fruit, etc. Representative fruit flavor adjuncts include acids, such as adipic, citric, malic, succinic and fumaric acid, and citrus oils, such as lemon oil, orange oil, lime oil, grapefruit oil, and fruit essences, such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewable gum base with or without conventional preservatives.

The above-described chewing gums containing the unique gum base of the invention may be prepared employing conventional processing techniques.

The following Examples represent preferred embodiments of the present invention.

EXAMPLE 1

A bubble gum base of the following formulation was prepaed as described below.

| Gum Base Ingredients | % by Weight |
| --- | --- |
| Styrene-butadiene elastomer | |
| (a) 24% bound styrene | 3 |
| (b) 48% bound styrene | 7 |
| Ester gum (glycerol ester of modified rosin) | 10 |
| Ester gum (glycerol ester of hydrogenated rosin) | 60 |
| Glycerol monooleate | 3 |
| Glycerol monostearate | 2 |
| Triglyceride | 2 |
| Paraffin wax | 6 |
| Microcrystalline wax | 7 |
| | 100% |

The elastomer and ester gums were mixed in a sigma blade mixer until homogeneous. Thereafter, the waxes were added with mixing followed by the remaining ingredients. Mixing was continued until a homogeneous mass was obtained.

The above gum base of the invention chews well, has reduced tackiness and has good bubble-blowing properties.

In addition, since it is free of CaCO₃, the gum base may be used with acid flavors and/or acid sweeteners such as aspartame and free acid form of saccharin. Also, the addition of 70% ester gum surprisingly does not adversely affect the abhesive properties of the base, and, in fact, makes the base less tacky.

EXAMPLE 2

A bubble gum base of the following formulation was prepared as described below.

| Gum Base Ingredient | % by Weight |
| --- | --- |
| Styrene-butadiene elastomer (30:70 mix of 24% bound styrene and 48% bound styrene material) | 10 |
| Ester gum | 10 |
| Ester gum | 62 |
| Glycerol monooleate | 5 |
| Microcrystalline wax | 7 |
| Paraffin wax | 6 |

The elastomer and ester gums were mixed in a sigma blade mixer until homogeneous. Thereafter, the waxes were added with mixing followed by the glycerol monooleate. Mixing was continued until a homogeneous mass was obtained.

The above gum base of the invention chews well, has reduced tackiness and has very good bubble-blowing properties.

In addition, since it is free of CaCO₃, the gum base may be used with acid flavors and/or acid sweeteners such as aspartame and free acid form of saccharin. Also, the addition of 72% ester gum surprisingly does not adversely affect the abhesive properties of the base, and, in fact, makes the base less tacky.

EXAMPLE 3

A bubble gum base of the following formulation was prepared as described in Example 2.

| Gum Base Ingredient | % by Weight |
| --- | --- |
| Styrene-butadiene elastomer (30:70 of 24% and 48% bound styrene) | 10 |
| Ester gum | 10 |
| Ester gum | 60 |
| Glycerol monooleate | 10 |
| Microcrystalline wax | 5 |
| Paraffin wax | 5 |

The above gum base of the invention chews well, has reduced tackiness and has excellent bubble-blowing properties.

In addition, since it is free of CaCO₃, the gum base may be used with acid flavors and/or acid sweeteners such as aspartame and free acid form of saccharin. Also, the addition of 70% ester gum surprisingly does not adversely affect the abhesive properties of the base, and, in fact, makes the base less tacky.

In a control run, to demonstrate the superiority of glycerol monooleate over glycerol monostearate in increasing film-forming capability of ester gum, the following was prepared as described in Example 2, except that glycerol monostearate was used in place of glycerol monooleate.

| Control Run A | |
| --- | --- |
| Gum Base Ingredient | % by Weight |
| Styrene-butadiene elastomer (30:70 mix of 24% and 48% bound styrene) | 10 |
| Ester gum | 10 |
| Ester gum | 60 |
| Glycerol monostearate | 10 |
| Microcrystalline wax | 5 |
| Paraffin wax | 5 |

The gum base so-prepared is found to be a poor bubble gum, with poor bubble blowing capability, thereby clearly evidencing superiorty of glycerol monooleate over glycerol monostearate.

EXAMPLE 4

A bubble gum base of the following formulation was prepared as described in Example 2.

| Gum Base Ingredient | % by Weight |
| --- | --- |
| Styrene-butadiene elastomer (30:70 mix of 24% and 48% bound styrene) | 10 |
| Ester gum | 10 |
| Ester gum | 60 |
| Glycerol monooleate | 15 |
| Microcrystalline wax | 5 |

The above gum base of the invention chews well, has reduced tackiness, and has excellent bubble-blowing properties. The gum base is initially very soft and remains soft over extended periods covering several weeks.

In addition, since it is free of CaCO₃, the gum base may be used with acid flavors and/or acid sweeteners such as aspartame and free acid form of saccharin. Also, the addition of 70% ester gum surprisingly does not adversely affect the abhesive properties of the base, and, in fact, makes the base less tacky.

EXAMPLE 5

A bubble gum base of the following formulation was prepared as described in Example 2.

| Gum Base Ingredient | % by Weight |
| --- | --- |
| Styrene-butadiene elastomer (48% bound styrene) | 10 |
| Ester gum | 10 |
| Ester gum | 65 |
| Oleic acid | 10 |
| Microcrystalline wax | 5 |

The above gum base of the invention chews well, has reduced tackiness, and has very good bubble-blowing properties. The gum base is initially very soft and remains soft over extended periods covering several weeks.

In addition, since it is free of CaCO₃, the gum base may be used with acid flavors and/or acid sweeteners such as aspartame and free acid form of saccharin. Also, the addition of 75% ester gum surprisingly does not adversely affect the abhesive properties of the base, and, in fact, makes the base less tacky.

EXAMPLE 6

A bubble gum base of the following formulation was prepared as described in Example 2.

| Gum Base Ingredient | % by Weight |
| --- | --- |
| Styrene-butadiene elastomer (48% bound styrene) | 10 |
| Ester gum | 10 |
| Ester gum | 65 |
| Polyglycerol ester of oleic acid | 10 |
| Microcrystalline wax | 5 |

The above gum base of the invention chews well, has reduced tackiness, and has excellent bubble-blowing properties. The gum base is initially very soft and remains soft over extended periods covering several weeks.

In addition, since it is free of $CaCO_3$, the gum base may be used with acid flavors and/or acid sweeteners such as aspartame and free acid form of saccharin. Also, the addition of 75% ester gum surprisingly does not adversely affect the abhesive properties of the base, and, in fact, makes the base less tacky.

EXAMPLE 7

A bubble gum base of the following formulation was prepared as described in Example 2.

| Gum Base Ingredient | % by Weight |
| --- | --- |
| Styrene-butadiene elastomer (48% bound styrene) | 10 |
| Ester gum | 10 |
| Ester gum | 65 |
| Tween 85 | 10 |
| Microcrystalline wax | 5 |

The above gum base of the invention chews well, has reduced tackiness, and has good bubble-blowing properties. The gum base is initially very sot and remains soft over extended periods covering several weeks.

In addition, since it is free of $CaCO_3$, the gum base may be used with acid flavors and/or acid sweeteners such as aspartame and free acid form of saccharin. Also, the addition of 75% ester gum surprisingly does not adversely affect the abhesive properties of the base, and, in fact, makes the base less tacky.

In a control run to further demonstrate the superiority of glycerol monooleate over glycerol monostearate in increasing film-forming capability of ester gum, the following gum base was prepared as described in Control Run A.

| Control Run B | |
| --- | --- |
| Gum Base Ingredient | % by Weight |
| Styrene-butadiene elastomer (30:70 mix of 24% and 48% bound styrene) | 10 |
| Ester gum | 10 |
| Ester gum | 60 |
| Glycerol monostearate | 15 |
| Microcrystalline wax | 5 |

The gum base produced is found to be initially hard and gets harder on standing, and is very difficult to blow bubbles with. Thus, it is again seen that glycerol monostearate is not an effective film-forming agent for ester gums.

EXAMPLE 8

A bubble gum having the following composition was prepared as described below:

| Ingredient | % by Weight of the Chewing Gum |
| --- | --- |
| Gum base (as described in Ex. 1) | 22 |
| Sugar pulverized | 52 |
| Corn syrup 43° Be | 23 |
| Softeners | 1.5 |
| Flavor | 1.0 |
| Color | 0.05 |

The gum base was melted (temperature 250° F.) and placed in a standard dough mixer kettle equipped with sigma blades and cooled to 180° F. The corn syrup, softeners and color were added with mixing over a 5 minute period, thereafter the pulverized sugar and flavors were added according to conventional chewing gum practice and mixed for 5 minutes. The gum was discharged from the kettle and was rolled or extruded and cut into sticks or cubes.

The resulting chewing gum product is found to have a good chew and has improved bubble blowing properties.

EXAMPLE 9

A bubble gum having the following composition was prepared as described below:

| Ingredient | % by Weight of the Chewing Gum |
| --- | --- |
| Gum base (as described in Ex. 2) | 24 |
| Sugar pulverized | 61 |
| Corn syrup, high fructose | 14 |
| Flavor | 1 |

The gum base was melted (temperature 250° F.) and placed in a standard dough mixer kettle equipped with sigma blades and cooled to 180° F. The corn syrup was added with mixing over a 5 minute period thereafter the pulverized sugar and flavors were added according to conventional chewing gum practice and mixed for 5 minutes. The gum was discharged from the kettle and was rolled or extruded and cut into sticks or cubes.

The resulting chewing gum product is found to have a good chew and has very good bubble blowing properties.

EXAMPLE 10

A sugarless bubble gum in accordance with the present invention and having the following composition was prepared as described below:

| Ingredient | % by Weight of the Chewing Gum |
| --- | --- |
| Gum base (as described in Ex. 3) | 24 |
| Sorbitol | 49.4 |
| Mannitol | 5.5 |
| Sorbitol solution | 19.5 |
| Flavor | 1.5 |
| Sodium saccharin | 0.1 |

The gum base was melted (temperature 250° F.) and placed in a standard dough mixer kettle equipped with sigma blades and cooled to 180° F. The mannitol and sorbitol powder were added with mixing over a 5 minute period; thereafter the flavor, sorbitol solution and sodium saccharin were added according to conventional chewing gum practice and mixed for 5 minutes. The gum was discharged from the kettle and was rolled or extruded and cut into sticks or cubes.

The resulting chewing gum product is found to have a good chew, a pleasant sweet taste and has excellent bubble blowing properties.

EXAMPLE 11

A sugarless bubble gum in accordance with the present invention and having the following composition was prepared as described below:

| Ingredient | % by Weight of the Chewing Gum |
|---|---|
| Gum base (as described in Ex. 4) | 24 |
| Sorbitol powder | 63.5 |
| Mannitol | 5 |
| Flavor | 1.5 |
| Water | 6 |

The gum base was melted (temperature 250° F.) and placed in a standard dough mixer kettle equipped with sigma blades and cooled to 180° F. The powdered sorbitol and mannitol were added with mixing over a 5 minute period; thereafter the flavor and water were added according to conventional chewing gum practice and mixed for 5 minutes. The gum was discharged from the kettle and was rolled or extruded and cut into sticks or cubes.

The resulting chewing gum product is found to have a good chew and has excellent bubble blowing properties and reduced tackiness.

EXAMPLE 12

A bubble gum having the following composition was prepared as described below:

| Ingredient | % by Weight of the Chewing Gum |
|---|---|
| Gum base (as described in Ex. 5) | 24 |
| Sugar pulverized | 52 |
| Corn syrup 43° Be | 21 |
| Softeners | 1.95 |
| Flavor | 1 |
| Color | 0.05 |

The gum base was melted (temperature 250° F.) and placed in a standard dough mixer kettle equipped with sigma blades and cooled to 180° F. The corn syrup, softeners and color were added with mixing over a 5 minute period; thereafter the pulverized sugar and flavors were added according to conventional chewing gum practice and mixed for 5 minutes. The gum was discharged from the kettle and was rolled or extruded and cut into sticks or cubes.

The resulting chewing gum product is found to have a good chew and has very good bubble blowing properties.

EXAMPLE 13

A bubble gum having the following composition was prepared as described below:

| Ingredient | % by Weight of the Chewing Gum |
|---|---|
| Gum base (as described in Ex. 6) | 22 |
| Sugar pulverized | 52.5 |
| Corn syrup 43° Be | 22 |
| Softeners | 0.75 |
| Flavor | 1.2 |
| Color | 0.05 |
| Citric acid | 1.5 |

The gum base was melted (temperature 250° F.) and placed in a standard dough mixer kettle equipped with sigma blades and cooled to 180° F. The corn syrup, softeners and color were added with mixing over a 5 minute period; thereafter the pulverized sugar and flavors were added according to conventional chewing gum practice and mixed for 5 minutes. The gum was discharged from the kettle and was rolled or extruded and cut into sticks or cubes.

The resulting chewing gum product is found to have a good chew, tart flavor, has excellent bubble blowing properties, and exhibits reduced tackiness.

EXAMPLE 14

A bubble gum having the following composition was prepared as described below:

| Ingredient | % by Weight of the Chewing Gum |
|---|---|
| Gum base (as described in Ex. 7) | 22 |
| Sugar pulverized | 52.95 |
| Corn syrup 43° Be | 23 |
| Softeners | 1 |
| Flavor | 1 |
| Color | 0.05 |

The gum base was melted (temperature 250° F.) and placed in a standard dough mixer kettle equipped with sigma blades and cooled to 180° F. The corn syrup, softeners and color were added with mixing over a 5 minute period; thereafter the pulverized sugar and flavors were added according to conventional chewing gum practice and mixed for 5 minutes. The gum was discharged from the kettle and was rolled or extruded and cut into sticks or cubes.

The resulting chewing gum product is found to have a good chew and has good bubble blowing properties.

What is claimed is:

1. A gum base which has excellent film-forming capability, comprising from about 0.5 to about 25% by weight of an elastomer, from about 50 to about 85% by weight of one or more ester gums, and from about 1 to about 25% by weight of a plasticizer selected from the group consisting of acids selected from the group consisting of oleic acid, lauric acid, lactic acid, isostearic acid, caprylic acid and capric acid, esters of said acids, mono-, di- and triglycerol esters of said acids, polyglycerol esters of said acids having a hydrophobic hydrophilic character of HLB 2 to 13, sorbitan or polysorbate ester of said acids, stripped coco, and mixtures thereof, said gum base being substantially free of inorganic fillers.

2. The gum base as defined in claim 1 wherein said plasticizer is glycerol monooleate.

3. The gum base as defined in claim 2 wherein said glycerol monooleate is present in an amount within the range of from about 3 to about 20% by weight of said gum base.

4. The gum base as defined in claim 1 wherein said polyglycerol ester of a fatty acid is present in an amount within the range from about 3 to about 20% by weight of said gum base.

5. The gum base as defined in claim 1 wherein said ester gum is present in an amount within the range of from about 50 to about 80% by weight of said gum base.

6. The gum base as defined in claim 1 wherein said ester gum is glycerol ester of hydrogenated rosin, dimerized ester gum, pentaerythritol ester gum, polymerized ester gum, ester gum or mixtures thereof.

7. The gum base as defined in claim 1 wherein said elastomer is a styrene-butadiene copolymer, polyisobutylene, isobutylene-isoprene copolymer, or natural rubber.

8. The gum base as defined in claim 1 further including one or more waxes.

9. The gum base as defined in claim 8 wherein said waxes are present in an amount within the range of from about 1 to about 20% by weight of said gum base.

10. The gum base as defined in claim 8 further including one or more additional softeners present in an amount within the range of from about 0 to about 10% by weight of said gum base.

11. The gum base as defined in claim 1 wherein said gum base is a bubble gum base.

12. A chewing gum containing a gum base as defined in claim 1.

13. A bubble gum containing gum base as defined in claim 1.

* * * * *